US012391505B2

(12) United States Patent
Chesaux et al.

(10) Patent No.: US 12,391,505 B2
(45) Date of Patent: Aug. 19, 2025

(54) SHEET PROCESSING MACHINE

(71) Applicant: BOBST MEX SA, Mex (CH)

(72) Inventors: Stéphane Chesaux, Echallens (CH); Carles Sagués Mitjana, Villars-sous-Yens (CH)

(73) Assignee: BOBST MEX SA, Mex (CH)

( * ) Notice: Subject to any disclaimer, the term of this patent is extended or adjusted under 35 U.S.C. 154(b) by 202 days.

(21) Appl. No.: 18/257,196

(22) PCT Filed: Dec. 14, 2021

(86) PCT No.: PCT/EP2021/085754
§ 371 (c)(1),
(2) Date: Jun. 13, 2023

(87) PCT Pub. No.: WO2022/129087
PCT Pub. Date: Jun. 23, 2022

(65) Prior Publication Data

US 2024/0034587 A1 Feb. 1, 2024

(30) Foreign Application Priority Data

Dec. 17, 2020 (EP) .................................... 20215040

(51) Int. Cl.
*B65H 29/04* (2006.01)
*B26D 7/18* (2006.01)

(52) U.S. Cl.
CPC ......... *B65H 29/044* (2013.01); *B26D 7/1818* (2013.01); *B65H 29/047* (2013.01); *B65H 2403/513* (2013.01); *B65H 2404/3421* (2013.01); *B65H 2801/42* (2013.01)

(58) Field of Classification Search
CPC .. B65H 29/041; B65H 29/044; B65H 29/047; B65H 29/048; B65H 2404/3421
See application file for complete search history.

(56) References Cited

U.S. PATENT DOCUMENTS

| | | | | |
|---|---|---|---|---|
| 5,722,530 | A | 3/1998 | Gunschera | |
| 11,007,662 | B2 * | 5/2021 | Ruchet ................. | B26D 7/1818 |

FOREIGN PATENT DOCUMENTS

| | | | |
|---|---|---|---|
| DE | 602004011618 T2 | 4/2009 |
| EP | 1034924 A1 | 9/2000 |
| JP | H01129175 U | 9/1989 |
| JP | 2006111451 A | 4/2006 |
| JP | 2019510649 A | 4/2019 |
| TW | 202017834 A | 5/2020 |

* cited by examiner

*Primary Examiner* — Jeremy R Severson
(74) *Attorney, Agent, or Firm* — Bookoff McAndrews, PLLC

(57) ABSTRACT

A sheet processing machine with a transfer mechanism for moving sheets along a handling direction of the sheet processing machine and with a waste evacuation device (36) for releasing the sheets. The transport mechanism comprises at least one sheet handling element (28) for moving a sheet. The waste evacuation device (36) further comprises a passage (46) formed between an opening surface (48) and a restraint surface (50). The at least one sheet handling element (28) comprises a first sliding element (68) and a second sliding element (70) being in contact with the opening surface (48) and the restraint surface (50), respectively, when passing the waste evacuation device (36).

16 Claims, 3 Drawing Sheets

SHEET PROCESSING MACHINE

CROSS-REFERENCE TO RELATED APPLICATION(S)

This application is a National Stage Application under 35 U.S.C. § 371 of International Application No. PCT/EP2021/085754, filed on Dec. 14, 2021, which claims priority to European Application No. 20215040.5, filed on Dec. 17, 2020, the entireties of which are incorporated herein by reference.

The invention relates to a sheet processing machine with a waste evacuation device.

Sheet processing machines, also known as converting machines, are used in the packaging industry for processing raw materials, e.g. cardboard, paper or foils, into intermediate or finished products, typically in the form of sheets. Converting operations can e.g. include printing, cutting, creasing, blanking, stamping and/or folding-gluing. Typically, the individual operations are done in subsequent processing stations of the sheet processing machine with the sheets being conveyed from one processing station to the subsequent one by a transfer mechanism.

E.g. in die-cutting machines, so-called blanks are obtained from the sheets made of raw material. Blanking operations e.g. involve breaking nicks in sheets by blanking tools, wherein the nicks have been formed in a previous processing step, thereby pushing the blanks downwards into a piling area for collecting the blanks. Accordingly, after the blanking operation, waste sheets remain connected to the transfer mechanism and need to be removed in a subsequent waste evacuation station (also known as waste ejection station).

Modern sheet processing machines enable a high throughput of sheets, i.e. a high processing speed. To achieve such processing speeds, it is desirable to release the waste sheets from the transfer mechanism in a dynamic manner, i.e. it is desired to release the waste sheets without the need to stop the transfer mechanism.

However, the high processing speeds can lead to unwanted rotations and/or misalignment of components of the transfer mechanism in the waste evacuation station which can lead to damages and unplanned downtimes of the sheet processing machine.

This effect becomes more pronounced, the larger the size of the sheets to be processed are due to the necessary larger sizes of the components of the sheet processing machine.

DE 60 2004 011 618 T2 discloses a sheet processing machine comprising a conveyor belt with which a multitude of gripper bars are moved to transport sheets within the sheet processing machine. In a blanking station of the sheet processing machine, the sheets can be released by tilting the gripper bar around a transverse shaft within the blanking station, resulting in a downwards motion of grippers of the gripper bar and the sheets attached to said grippers, such that the sheets are held back by front stops of a comb and are collected in the blanking station while the grippers can pass the comb. However, the presented system is only suited when the sheet is moved along a straight horizontal passage, e.g. in a blanking station, as the tilting motion can lead to unwanted rotations of the gripper bar.

The object of the invention is to provide a robust and simple means for waste ejection in a sheet processing machine. Preferably, the provided solution is also suitable for processing sheets of large size.

The object of the invention is solved by a sheet processing machine with a transfer mechanism for moving sheets along a handling direction of the sheet processing machine and with a waste evacuation device for releasing the sheets. The transport mechanism comprises at least one sheet handling element for moving a sheet. The waste evacuation device further comprises a passage formed between an opening surface and a restraint surface. The at least one sheet handling element comprises a first sliding element and a second sliding element being in contact with the opening surface and the restraint surface, respectively, when passing the waste evacuation device.

The at least one sheet handling element is adapted to release the sheet when passing the waste evacuation device, wherein especially the interaction of the opening surface and the first sliding element is responsible for releasing the sheet.

The invention is based on the idea to provide a passage for the sheet handling element resulting in a well-defined trajectory of the sheet handling element when passing the waste evacuation device. With other words, rotations of the sheet handling element can effectively be suppressed in the passage of the waste evacuation device. Accordingly, the orientation of the sheet handling element when passing the waste evacuation device remains within a well-defined range.

Therefore, according to the invention the at least one sheet handling element is adapted to remain aligned with its trajectory along the course of the passage formed between the opening surface and the restraint surface. With other words, the at least one sheet handling element does not rotate or tilt within the passage.

The sliding interactions between the first sliding element and the opening surface and the second sliding element and the restraint surface enable the sheet handling element to pass the waste evacuation device in a dynamic manner, i.e. without any interruptions and/or stops of the transfer mechanism, while at the same time wear of the involved components can be minimized. This allows for high processing speeds of the sheet processing machine.

Preferably, the at least one sheet handling element has a leading edge defining a length direction of the sheet handling element and a trailing edge being opposite to the leading edge along a width direction of the sheet handling element, the width direction being perpendicular to the length direction. Additionally, the first sliding element and the second sliding element are arranged at the same side of the sheet handling element with respect to a central axis of the width direction, the central axis being perpendicular to both the length direction and the width direction.

With other words, in this variant of the sheet processing machine according to the invention, the first sliding element and the second sliding element are positioned at the same half of the sheet handling element with respect to the central axis. This arrangement is preferable to correlate the forces acting on the first and second sliding element, respectively, in the passage such that rotations of the sheet handling element are effectively suppressed.

With the term “leading edge” the part of the sheet handling element is denoted which is arranged at the front of the sheet handling element relative to a handling direction of the sheets being processed in the sheet processing machine.

To further prevent or at least minimize deformations of the at least one sheet handling element when passing the waste evacuation device, caused e.g. due to centrifugal forces acting on the at least one sheet handling element, at least one stabilizing slider can be arranged on the leading edge.

The stabilizing sliders can interact with alignment elements of the waste evacuation device, e.g. cams providing sliding surfaces for the interaction with the at least one stabilizing sliders.

The sheet handling element especially has a length along the length direction of 106 cm or more, e.g. the length direction has a length of from 140 to 170 cm.

The length of the sheet handling element along the length direction especially corresponds to the size of the sheets to be processed by the sheet processing machine. Accordingly, the sheet processing machine according to the invention especially allows for processing sheets of large size as the sheet handling element can be stabilized by interaction of the first and second sliding elements and the opening surface and the restraint surface, respectively.

The first sliding element and the second sliding element can be arranged at the trailing edge of the at least one sheet handling element. Such an arrangement is especially preferable to further compensate with the first and second sliding element for forces acting on the leading edge of the sheet handling element to prevent or at least minimize any rotations of the sheet handling element.

Preferably, the first sliding element and the second sliding element are at least partially arranged at opposite side surfaces of the at least one sheet handling element.

With other words, the interaction between the first sliding element and the opening surface and the interaction between the second sliding element and the restraint surface preferably take place at opposite sides of the sheet handling element for stabilizing the alignment of the sheet handling element.

The side surfaces especially connect the leading edge and the trailing edge of the sheet handling element.

To minimize any rotations of the sheet handling element due to the interaction of the first sliding element and the opening surface, the restraint surface can apply a restraint force on the second sliding element which is at least of the size of an opening force applied by the opening surface on the first sliding element.

The direction of the restraint force is especially essentially opposite to the direction of the opening force.

Accordingly, the restraint force and the opening force are such that the at least one sheet handling element does not rotate or tilt within the passage of the waste evacuation device.

The passage formed between the opening surface and the restraint surface is curved.

E.g., the passage can be arranged such to be in line with a travel direction of the sheet handling element when passing the waste evacuation station. This means that the transfer mechanism can travel around a loop in which the sheet is moved along the handling direction by the sheet handling element for essentially one half of the loop and can travel back to a starting position without the sheet along a reverse direction for essentially the other half of the loop for gripping a next sheet to be processed. The passage can be arranged at the turning point between the two halves of the loop at the waste evacuation device.

Preferably, the first sliding element and/or the second sliding element is a roller. By using rollers as first and/or second sliding element, any forces acting on the first and/or second sliding element can be translated into a circular motion of the roller, thereby eliminating or at least minimizing the risk of damaging the first and sliding element, respectively, when interacting with the opening surface and the restraint surface, respectively.

The opening surface can be part of an opening cam and the restraint surface can be part of an anti-rotating cam of the waste evacuation device. Cams are cheap and are available in a variety of sizes and shapes to provide a desired course of the passage of the waste evacuation device. Further, they can be designed such to minimize the needed space.

For interaction with the sheets being processed in the sheet processing machine, the at least one sheet handling element can comprise at least one gripping element being displaceable between a sheet gripping state and a sheet releasing state, the at least one gripping element especially being arranged at the trailing edge of the at least one sheet element.

Accordingly, the at least one sheet handling element can especially be a gripper bar, preferably a gripper bar comprising a plurality of gripping elements.

The first sliding element can be adapted to control the state of the at least one gripping element. E.g., the first sliding element and the at least one gripping element can be connected by an opening mechanism, wherein the opening force experienced by the first sliding element when passing the waste evacuation device is transferred from the first sliding element to the opening mechanism resulting in displacing the at least one gripping element from the sheet gripping state to the sheet releasing state. As soon as the opening force is not acting anymore on the first sliding element, the at least one gripping element can be displaced back to the sheet gripping state by the opening mechanism.

The waste evacuation device can further comprise a comb comprising a plurality of teeth. The comb is used to retain the waste sheet delivered by the transfer mechanism to the waste evacuation device while allowing the sheet handling element to pass by. Accordingly, the teeth of the comb are especially arranged such that the at least one gripping element of the at least one sheet handling element can pass the comb.

Preferably, the at least one sheet handling element comprises a first and a second set of sliding elements, each set comprising a first sliding element and a second sliding element, wherein the first and second set of sliding elements are arranged at a first end section and a second end section, respectively, the first end section and the second end section being at opposite ends of the at least one sheet handling element along the length direction of the at least one sheet handling element.

In this variant, the sheet handling element can be stabilized against rotations at the two peripheral ends of the sheet handling element, resulting in an especially stable orientation of the sheet handling element when passing the waste evacuation device.

Accordingly, the waste evacuation device preferably comprises a first passage for the first set of sliding elements and a second passage for the second set of sliding elements. The first and second passages each correspond to the passage as described before.

To allow faster processing speeds of the sheet processing machine, the transfer mechanism preferably comprises a plurality of sheet handling elements connected by chain linker elements, i.e. the plurality of sheet handling elements essentially form a chain of linked sheet handling elements. This results in a tension in the individual sheet handling elements which can already minimize the extent of rotations of the individual sheet handling elements by restricting the movement of the sheet handling elements.

With other words, the plurality of sheet handling elements is aligned with the chain linker elements, i.e. each of the plurality of the sheet handling elements travels along the same path as the chain linker elements including the path when travelling through the passage of the waste evacuation device.

The transfer mechanism preferably moves the sheets from a loading station of the sheet processing machine to a waste evacuation station of the sheet processing machine comprising the waste evacuation device.

Further advantages and features of the invention will become apparent from the following description of the invention and from the appended figures which show a non-limiting exemplary embodiment of the invention and in which:

FIG. 1 schematically shows a sheet processing machine according to the invention;

Figure 1:
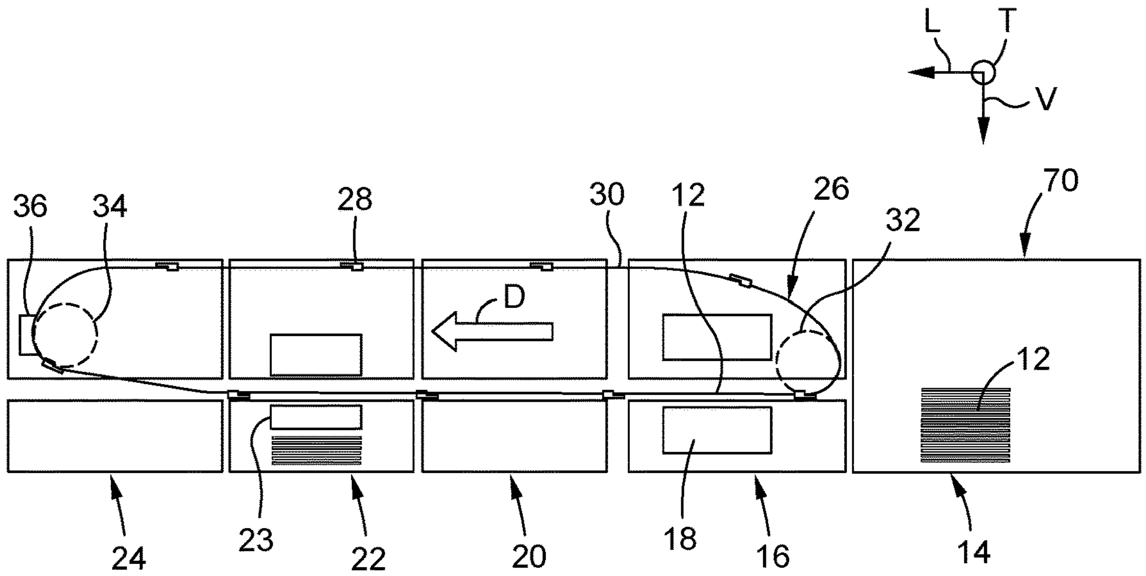

FIG. 1 schematically shows a sheet processing machine 10 making it possible to cut blanks from a succession of sheets 12. These blanks are usually intended to be subsequently folded and bonded to form packaging boxes. However, the sheets 12 might generally be made of e.g. paper, cardboard, foil, a composite material thereof or any other material routinely used in the packaging industry.

The sheet processing machine 10 comprises a series of processing stations that are juxtaposed but interdependent one another in order to form a unitary assembly. The processing machine 10 includes a loading station 14 followed by a cutting station 16 (also usually named punching station) comprising for example a die or platen press 18 where the sheets 12 are transformed by cutting, a waste removal station 20 wherein most of the waste parts are stripped, a blank separation station 22 (also usually named reception station) for separation of the blanks (or blanking operation) by means of a blanking tool 23 and a waste evacuation station 24 for removing the residual waste sheets of the punched sheets 12.

The number and nature of the processing stations may vary depending on the nature and the complexity of the converting operations to be carried out on the sheets 12.

The sheet processing machine 10 also has a transfer mechanism 26, which in the shown embodiment is a conveyor, to make it possible to individually move each sheet 12 from an outlet of the loading station 14 to the waste evacuation station 24.

The conveyor uses a series of sheet handling elements 28 that are mounted so as to be moveable by means of two loops of chains 30 one placed laterally on each side of the sheet processing machine 10. Each loop of chains 30 travels around a loop which allows the sheet handling elements 28 to follow a trajectory passing successively by the cutting station 16, the waste removal station 20, the blank separation station 22 and the evacuation station 24.

Each sheet handling element 28 travels for essentially the first half of its passage on an outward path in a substantially horizontal plane of passage between a driven wheel 32 and an idler wheel 34, and then for essentially the second half of its passage on a return path in the top portion of the sheet processing machine 10. Once returned to the driven wheel 32, each sheet handling element 28 is then able to grip a new sheet 12 at a front edge of the sheet 12.

In the shown embodiment, the sheet handling elements 28 are so-called gripper bars.

In FIG. 1, each processing station is illustrated in the form of two rectangles symbolizing respectively its top portion and its bottom portion that are positioned on each side of the plane of movement of the sheets 12.

In FIG. 1, a transverse (or lateral), longitudinal and vertical direction are indicated by the orthogonal spatial system (T, L, V).

The terms "upstream" and "downstream" are defined with reference to the direction of movement of sheets 12 in a handling direction as illustrated by the arrow D in FIG. 1.

The waste evacuation station 24 further comprises a waste evacuation device 36 for releasing sheets 12 having been moved from the loading station 14 to the waste evacuation station 24, i.e. for removing the waste sheets.

Figure 2:
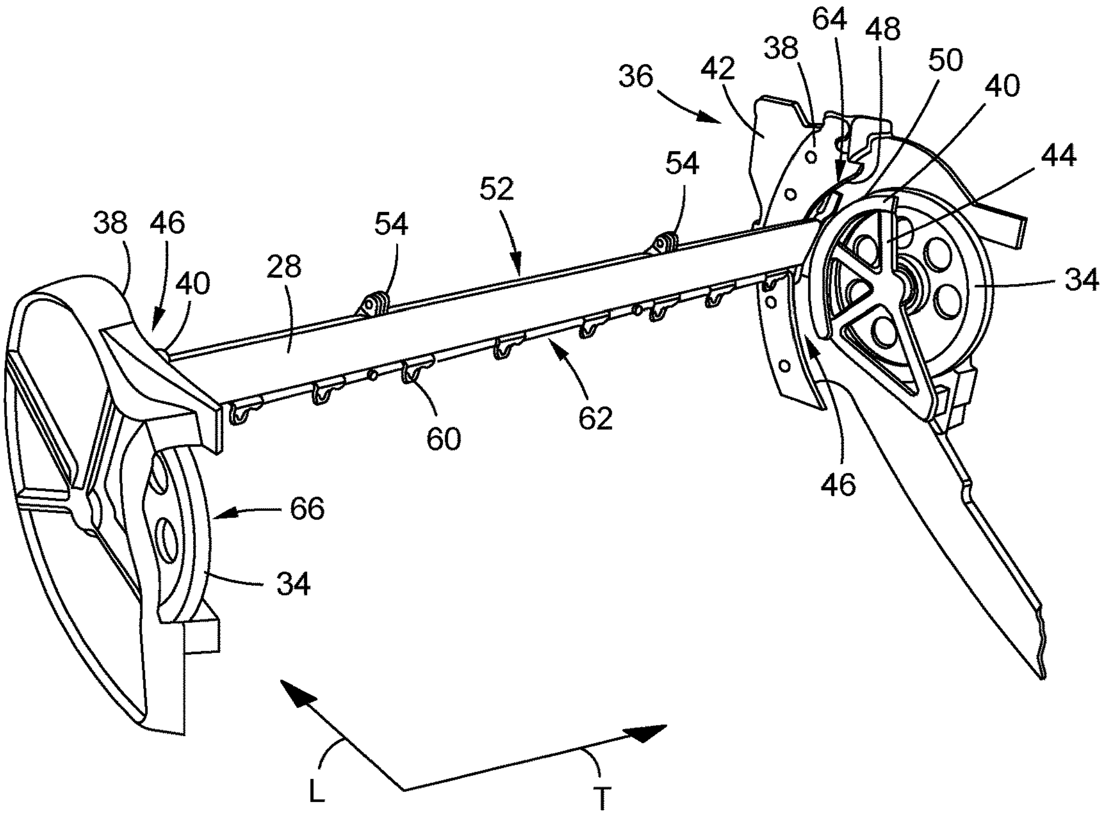
FIG. 2 shows a perspective view of a waste evacuation device of the sheet processing machine of FIG. 1.

FIG. 2 shows a perspective view of the waste evacuation device 36.

The waste evacuation device 36 comprises an opening cam 38 and an anti-rotating cam 40.

The opening cam 38 is fixed to a frame 42 while the anti-rotating cam 40 is fixed to connection bars 44 of the idler wheel 34.

The opening cam 38 and the anti-rotating cam 40 define a passage 46 formed between an opening surface 48 of the opening cam 38 and a restraint surface 50 of the anti-rotating cam 40.

As easily seen in FIG. 2, the passage 46 is curved with a curvature adjusted to the curvature of the idler wheel 34.

Accordingly, the passage 46 essentially forms a turning point in the loop of chains 30 of the transfer mechanism 26 (see FIG. 1).

FIG. 2 depicts a state in which one of the sheet handling elements 28 is passing the waste evacuation device 36.

The sheet handling element 28 is a gripper bar with a leading edge 52 defining a length direction of the sheet handling element 28.

The length direction extends along the transverse direction T and defines the size of the sheets 12 along the transverse direction T being manageable by the sheet processing machine 10.

At the leading edge, two stabilizing sliders 54 are arranged which are used to prevent or at least minimize deformations of the sheet handling element 28 when passing the waste evacuation device 36, e.g. due to centrifugal forces acting on the sheet handling element 28.

Figure 5:
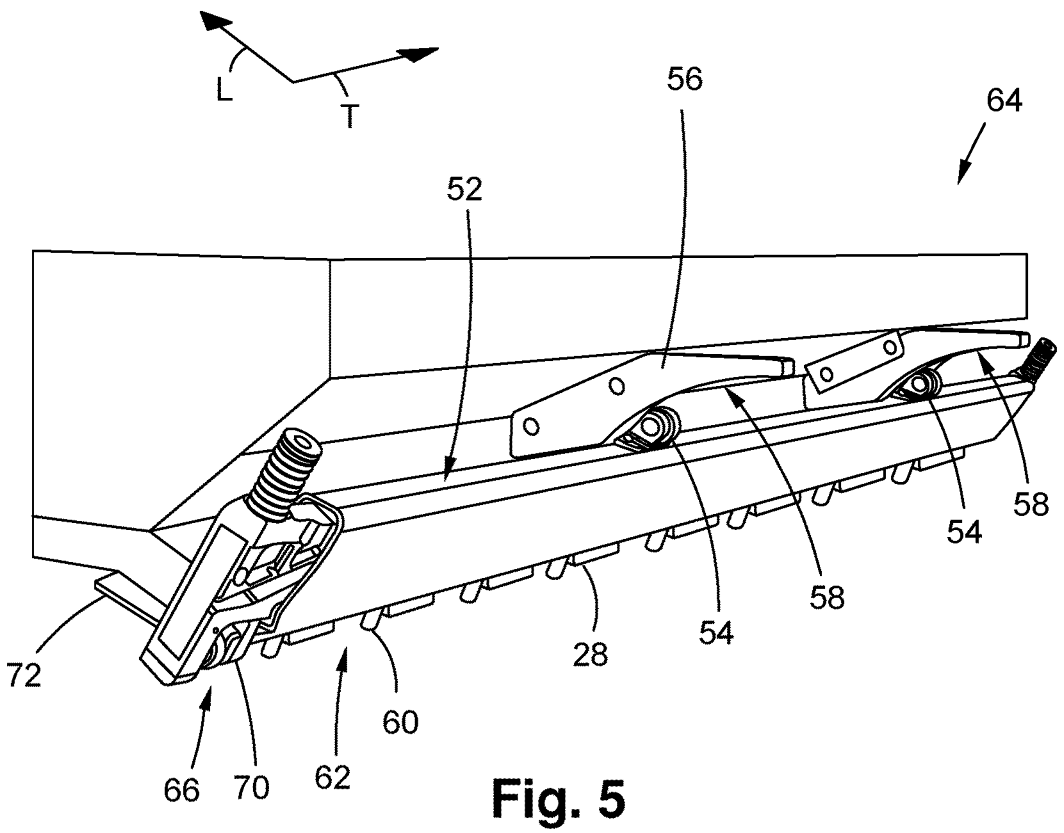
FIG. 5 shows a perspective view of additional components of the waste evacuation device of FIG. 2.

The stabilizing sliders 54 are interacting with alignment elements 56 of the waste evacuation device 36 which are cams providing sliding surfaces 58 for the stabilizing sliders 54 (see FIG. 5).

Opposite to the leading edge 52, the sheet handling element 28 comprises a plurality of gripping elements 60 at a trailing edge 62 of the sheet handling element 28.

Figure 3:
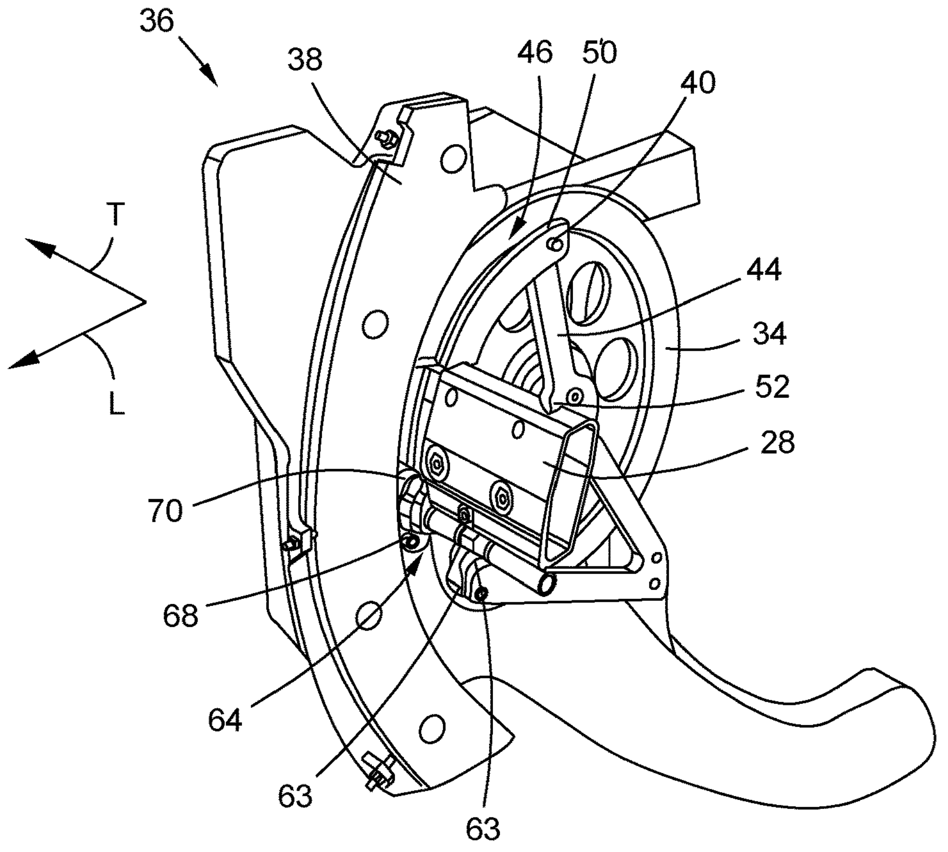
FIG. 3 shows another perspective view of selected parts of the waste evacuation device of FIG. 2.

The gripping elements 60 are displaceable between a sheet gripping state and a sheet releasing state, wherein each of the gripping elements 60 comprise two arms 63 which are pressed against each other in the gripping state (see FIG. 3). In the sheet releasing state, the arms 63 of the gripping elements 60 are being moved apart of each other to allow a sheet 12 to be placed between the arms 63. When displaced back to the gripping state, the sheet 12 is accordingly pressed between the arms 63 and becomes fixed.

The sheet handling element 28 has a first end section 64 and a second end section 66 at opposite ends of the sheet handling element 28 along the length direction (see also FIG. 5).

As shown in FIG. 2, the waste evacuation device 36 comprises an opening cam 38 and an anti-rotating cam 40 both at the first end section 64 and at the second end section 66 of the sheet handling element 28. Accordingly, the passages 46 shown in FIG. 2 can also be differentiated as being a first passage and a second passage, respectively.

Figure 4:
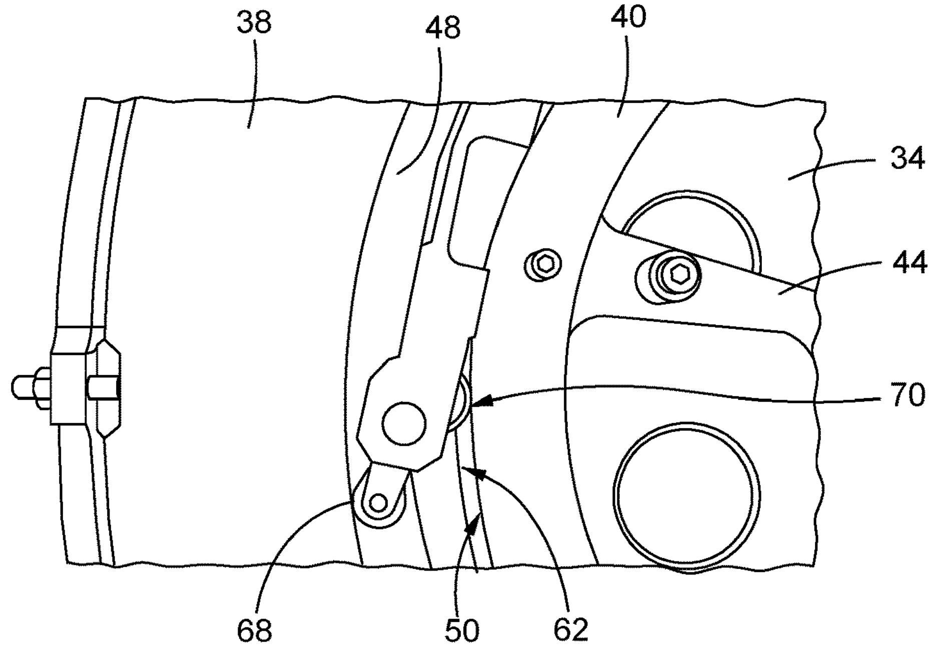
FIG. 4 shows a detail of the waste evacuation device of FIG. 2.

As shown in FIGS. 3 and 4, the sheet handling element 28 further comprises a first sliding element 68 and a second sliding element 70. Both the first sliding element 68 and the second sliding element 70 are rollers.

The first sliding element 68 and the second sliding element 70 are arranged such that when the sheet handling element 28 is passing the waste evacuation device 36, the first sliding element 68 interacts with the opening surface 48 and the second sliding element 70 interacts with the restraint surface 50.

Further, as becomes especially evident from FIG. 4, the first sliding element 68 and the second sliding element 70 are arranged at the trailing edge 62 of the sheet handling element 28.

Figure 6:
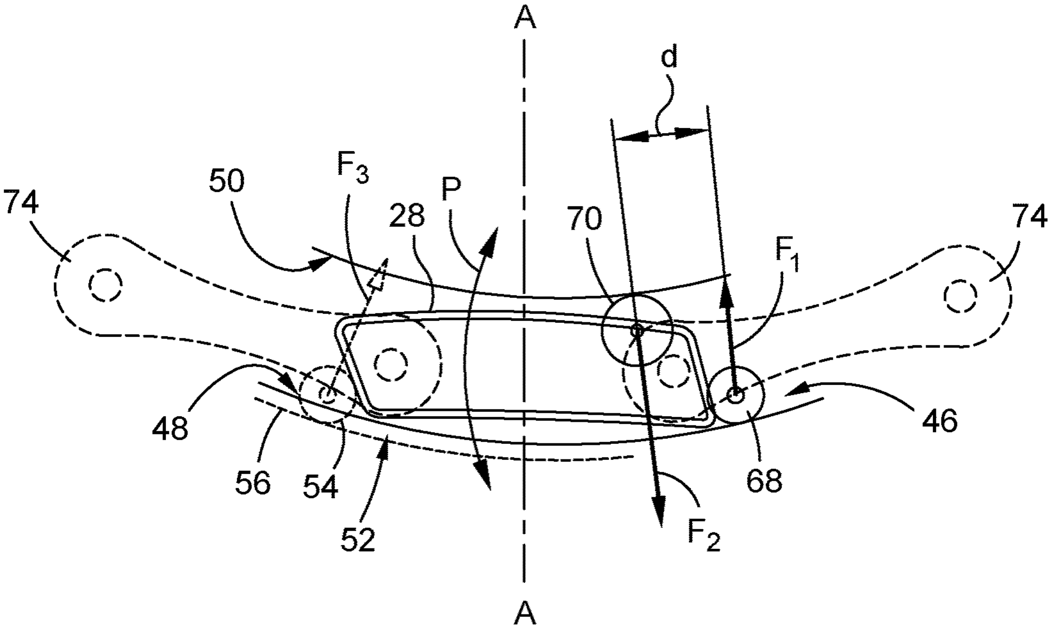
FIG. 6. illustrates schematically the mode of action of the waste evacuation device of FIG. 2.

Further, both the first sliding element 68 and the second sliding element 70 are arranged at the same side of the sheet handling element 28 relative to a central axis A-A (see FIG. 6).

The central axis A-A is perpendicular to both the length direction and a width direction of the sheet handling element 28, wherein the width direction is perpendicular to the length direction.

The sheet handling element 28 comprises another first sliding element 68 and another second sliding element 70 at the second end section 66. Accordingly, the sheet handling element 28 comprises a first set of sliding elements at the first end section 64 and a second set of sliding elements at the second end section 66.

The waste evacuation device further comprises a comb 72 with a plurality of (not shown) teeth (see FIG. 5).

In the following, the mode of action of the waste evacuation device 36 will be described in more detail.

During operation of the sheet processing machine 10, the gripping elements 60 of the sheet handling element 28 are used to grip a front edge of the sheet 12 at an outlet of the loading station 14 (see FIG. 1), i.e. the gripping elements 60 are brought into their gripping state.

The sheet 12 is then moved by the movement of the sheet handling element 28 along the handling direction D through the processing stations, resulting in a waste sheet being gripped by the gripping elements 60 when the sheet handling element 28 reaches the waste evacuation station 24 with the waste evacuation device 36.

As described above, the chain 30 of the transfer mechanism 26 defines an outward path and a return path. The transition between the outward path and the return path is defined by passing the turning point defined by the passage 46 and the idler wheel 34 at the waste evacuation device 36.

Therefore, the first end section 64 and the second end section 66 of the sheet handling element 28 are drawn into the respective passage 46 of the waste evacuation device 36 by the movement of the chain 30.

This results in bringing the first sliding element 68 into contact with the opening surface 48 which applies an opening force $F_1$ on the first sliding element 68.

The opening force $F_1$ is transferred by the first sliding element 68 by a (not shown) opening mechanism to the gripping elements 60. E.g., the opening force $F_1$ is transferred by a spring mechanism to the arms 63 of the gripping elements 60, resulting in the arms 63 moving apart of each other, i.e. the gripping elements 60 are displaced into their sheet releasing state.

Accordingly, the waste sheet which has been moved along with the sheet handling element 28, is released by the gripping elements 60 but impacts on the comb 72. Therefore, the waste sheet is retained while the sheet handling element 28 can pass the waste evacuation device 36. The retained waste sheets can be collected in the waste evacuation station 24 and discarded.

However, the opening force $F_1$ acting on the first sliding element 68 and used for displacing the gripping elements 60, could cause unwanted rotations of the sheet handling element 28.

This effect is illustrated in FIG. 6 which is a schematic depiction of the waste evacuation device 36. In FIG. 6, the opening cam 38, the anti-rotating cam 40 and the sheet handling element 28 are depicted in a flattened manner for simplification.

The double-arrow P shown in FIG. 6 illustrates the rotational movements of the sheet handling element 28 to be prevented by the waste evacuation device 36.

Further, the opening force $F_1$ acting on the first sliding element 68 is indicated by an arrow, too.

According to the invention, the second sliding element 70 is in contact with the restraint surface 50 of the anti-rotating cam 40, resulting in a restraint force $F_2$ acting on the second sliding element 70 and indicated by an arrow in FIG. 6, too.

The restraint force $F_2$ is preferably at least of the size of the opening force $F_1$, thus ideally eliminating or at least minimizing rotational movements of the sheet handling element 28.

Further, the first sliding element 68 and the second sliding element 70 are arranged at the same side of the sheet handling element 28 relative to the central axis A-A.

This arrangement is especially advantageous to minimize a distance d depicted in FIG. 6. As long as the distance d is smaller than the distance between the first sliding element 68 and the location of the central axis A-A along the width direction of the sheet handling element 28, the restraint force $F_2$ can effectively reduce the rotational movements of the sheet handling element 28.

Additionally, the roller 54 that rolls on element 56 generates a force $F_3$ to reduce further the rotational movements of the sheet handling element 28, by compensating the torque induced by forces $F_1$, $F_2$, and distance d, which is small but non-zero in the current embodiments. This compensation is effective when the processing machine runs at high speed; the forces $F_1$ and $F_2$ being strong and cause a critical torque. At a lower speed, the chain drive is able to compensate for the torque.

Additionally, in FIG. 6 chain linker elements 74 are indicated with dashed lines. The chain linker elements 74 connect the depicted sheet handling element 28 with the other sheet handling elements 28 of the transfer mechanism 26 (see FIG. 1), thereby providing a base level tension which, limits the extent of rotational movements of the sheet handling element 28.

The sheet processing machine 10 according to the invention allows to prevent any unwanted rotations of the sheet handling element 28 when passing the waste evacuation device 36. This enables the sheet processing machine 10 to release the waste sheets dynamically, i.e. without any stops of the transfer mechanism 26, even in the case of relatively large sheets 12. Further, no moving parts are needed in the waste evacuation device 36 for removing the waste sheets.

The invention claimed is:

1. A sheet processing machine comprising:

a transfer mechanism for moving sheets along a handling direction of the sheet processing machine; and a waste evacuation device for releasing the sheets, the transfer mechanism comprising at least one sheet handling element for moving a sheet, the waste evacuation device comprising a passage formed between an opening surface and a restraint surface, and the at least one sheet handling element comprising a first sliding element and a second sliding element being in contact with the opening surface and the restraint surface, respectively, when passing the waste evacuation device, wherein the transfer mechanism is adapted to travel in a loop with the at least one sheet handling element being moved along the handling direction for one half of the loop and being moved along a reverse direction for the other half of the loop, the passage being arranged at a turning point between the two halves of the loop.

2. The sheet processing machine according to claim 1, wherein the at least one sheet handling element is adapted to remain aligned with its trajectory along a course of the passage formed between the opening surface and the restraint surface.

3. The sheet processing machine according to claim 1, wherein the at least one sheet handling element has a leading edge defining a length direction of the sheet handling element and a trailing edge being opposite to the leading edge along a width direction of the sheet handling element, the width direction being perpendicular to the length direction, the first sliding element and the second sliding element being arranged at a same side of the sheet handling element with respect to a central axis of the width direction, the central axis being perpendicular to both the length direction and the width direction.

4. The sheet processing machine according to claim 3, wherein the first sliding element and the second sliding element are arranged at the trailing edge of the at least one sheet handling element.

5. The sheet processing machine according to claim 3, wherein the at least one sheet handling element comprises at least one gripping element being displaceable between a sheet gripping state and a sheet releasing state, the at least one gripping element being arranged at the trailing edge of the at least one sheet handling element.

6. The sheet processing machine according to claim 1, wherein the first sliding element and the second sliding element are at least partially arranged at opposite side surfaces of the at least one sheet handling element.

7. The sheet processing machine according to claim 1, wherein the restraint surface applies a restraint force on the second sliding element which is at least of a size of an opening force applied by the opening surface on the first sliding element.

8. The sheet processing machine according to claim 1, wherein the passage formed between the opening surface and the restraint surface is curved.

9. The sheet processing machine according to claim 1, wherein a curvature of the passage is adjusted to a curvature of an idler wheel of the transfer mechanism being arranged at the turning point.

10. The sheet processing machine according to claim 1, wherein the first sliding element and/or the second sliding element is a roller.

11. The sheet processing machine according to claim 1, wherein the opening surface is part of an opening cam and the restraint surface is part of an anti-rotating cam of the waste evacuation device, respectively.

12. The sheet processing machine according to claim 1, wherein the waste evacuation device further comprises a comb comprising a plurality of teeth.

13. The sheet processing machine according to claim 1, wherein the at least one sheet handling element comprises a first and a second set of sliding elements, each set comprising a first sliding element and a second sliding element, wherein the first and second set of sliding elements are arranged at a first end section and a second end section, respectively, the first end section and the second end section being at opposite ends of the at least one sheet handling element along a length direction of the at least one sheet handling element.

14. The sheet processing machine according to claim 13, wherein the waste evacuation device comprises a first passage for the first set of sliding elements and a second passage for the second set of sliding elements.

15. The sheet processing machine according to claim 1, wherein the transfer mechanism comprises a plurality of sheet handling elements connected by chain linker elements.

16. The sheet processing machine according to claim 1, wherein the transfer mechanism moves the sheets from a loading station of the sheet processing machine to a waste evacuation station comprising the waste evacuation device.

* * * * *